United States Patent [19]

Collins, IV

[11] Patent Number: 4,477,811
[45] Date of Patent: Oct. 16, 1984

[54] AUTOMATIC MDS LEVEL ANALYZER

[75] Inventor: Edward Collins, IV, Monte Sereno, Calif.

[73] Assignee: California Microwave, Inc., Sunnyvale, Calif.

[21] Appl. No.: 292,775

[22] Filed: Aug. 14, 1981

Related U.S. Application Data

[63] Continuation-in-part of Ser. No. 54,289, Jul. 2, 1979, abandoned.

[51] Int. Cl.³ .................................................. G01S 7/40
[52] U.S. Cl. .................................... 343/17.7; 434/5
[58] Field of Search ........................ 343/17.7; 375/10

[56] References Cited

U.S. PATENT DOCUMENTS

| | | | |
|---|---|---|---|
| 3,243,815 | 3/1966 | Dynan et al. | 343/17.7 |
| 3,544,996 | 12/1970 | Pile | 343/17.7 |
| 3,921,173 | 11/1975 | Thomson | 343/17.7 X |
| 4,305,076 | 12/1981 | Lepere et al. | 343/17.7 |
| 4,328,552 | 5/1982 | Stovall | 343/17.7 X |

Primary Examiner—Maynard R. Wilbur
Assistant Examiner—K. R. Kaiser
Attorney, Agent, or Firm—Hamrick, Hoffman, Guillot & Kazubowski

[57] ABSTRACT

An automatic minimum discernible signal level analyzer for evaluating the low signal level detecting capabilities of a pulse-type receiver and including an RF frequency source phase-locked to the radar transmitter frequency and capable of being adjusted in power output by circuitry which automatically measures the statistical noise content of the receiver video and adjusts the power output of the RF source so that the video signal meets preset values of probability of false alarm and probability of detection, the absolute RF power being then a direct measure of the minimum discernible signal sensitivity of the receiver under test.

13 Claims, 5 Drawing Figures

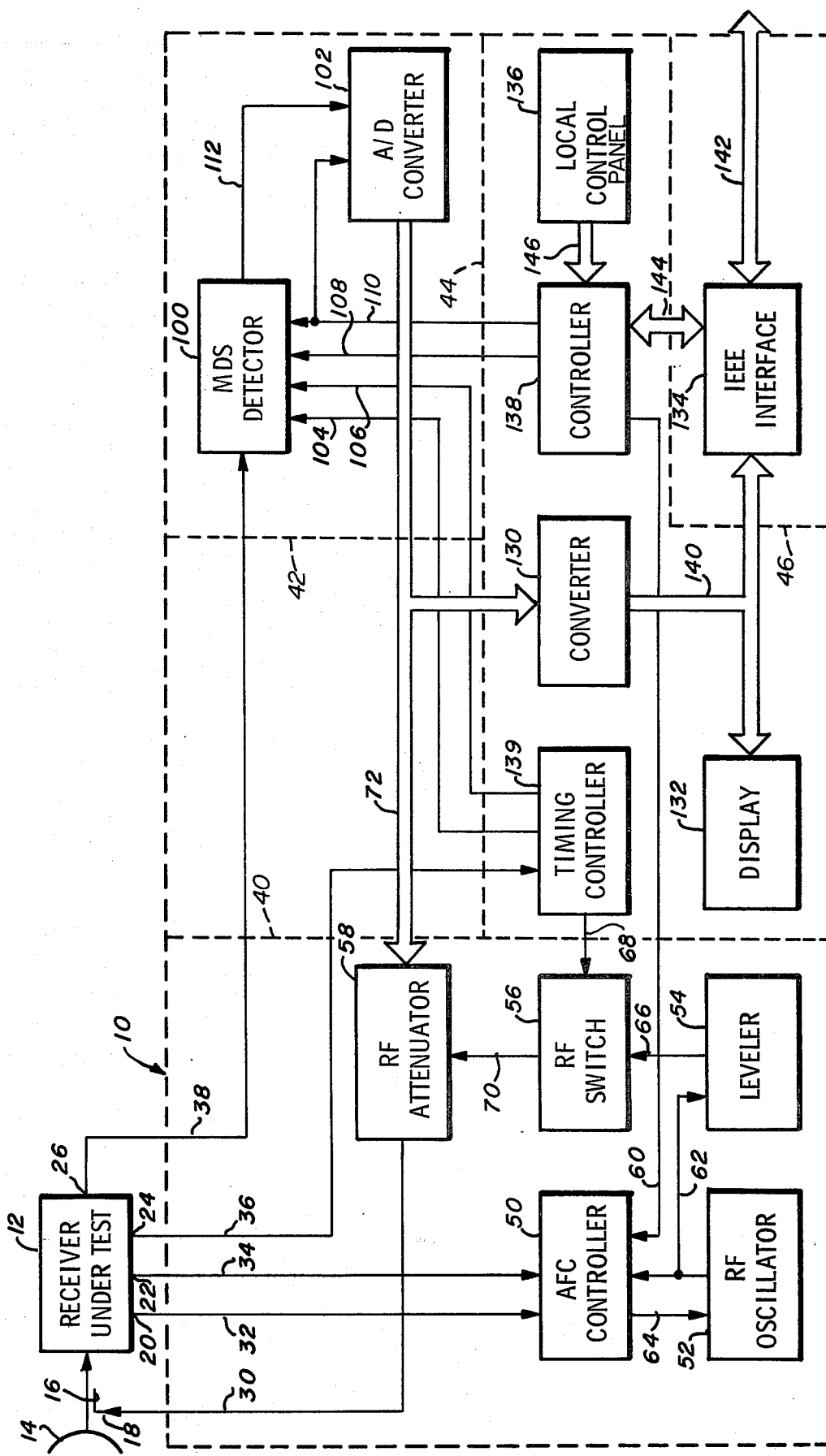
Fig_1

Fig_3

AUTOMATIC MDS LEVEL ANALYZER

CROSS-REFERENCE TO RELATED APPLICATION

The present application is a continuation-in-part of application Ser. No. 054,289, filed July 2, 1979, now abondoned and entitled "Automatic MDS Level Analyzer".

BACKGROUND OF THE INVENTION

1. Field of the Invention

The present invention relates generally to electronic test equipment and more particularly to a testing apparatus for automatically determining the minimum discernable signal level of a pulse receiver under test.

2. Description of the Prior Art

It is, of course, obvious that an important measure of the performance of a pulse-type RF receiver is its ability to detect low level signals. Although the need to measure such performance is recognized, and even required on a daily basis for radar receivers under FAA control, it has been found that present measurement techniques are inadequate. This is due in part to the fact that such prior art measurement techniques are poorly or inconsistently defined and further because such tests are highly subjective.

One such technique for measuring the low signal level detection capabilities of a pulse-type receiver is the tangential sensitivity measurement technique. Typically, an oscilloscope is connected to the video output of a receiver under test and adjusted such that the noise generated by the receiver may be observed. Next, an appropriate source of pulse modulated RF energy of known amplitude is coupled to the input of the receiver and the resultant video pulse monitored on the oscilloscope. Finally, the level of the energy source is adjusted so as to align an imaginary line drawn through the average level of the negative noise peaks on the video pulse with an imaginary line drawn through the average level of the positive peaks of the baseline adjacent to the video pulse. The receiver sensitivity is then determined by reference to the power level of the reference energy source.

As indicated, this test is highly subjective in that it is dependent upon the arbitrary levels at which the imaginary lines are drawn. Further, the test is influenced by the brightness setting of the oscilloscope. This is because the excursions of high frequency noise signals are more apparent as this setting is increased.

Another test of receiver sensitivity commonly utilized is the minimum discernable signal or MDS test. Typically, an oscilloscope and an energy source configured as previously described are employed. For this test, the amplitude of the reference source is adjusted to a level at which the resultant video pulse is just discernable. Here, again, the test is highly subjective, being dependent upon how hard one tries to discern the pulse. By knowing where the pulse is or should be, and by watching the apparent behavior of the noise in this region long enough, one can become convinced that a low level signal which is not otherwise obviously apparent is indeed visible.

Tests conducted to determine the subjectability and repeatability of these tests have disclosed variations in excess of 3 dB. In other words, a particular radar receiver might both be determined to be acceptable and also be 3 dB below that level at which maintenance is required.

It is useful at this point to examine what information the tests are designed to provide. Most commonly, these tests are designed to provide some indication of what receiver driving signal amplitude is required to insure a given degree of probability of signal detection given an acceptable level of false alarms. More specifically, the false-alarm probability has been defined as that period of time, during nonsignal conditions, in which the noise developed at the output of the receiver exceeds a given threshold level divided by the total observation time. In similar fashion, the probability of detection has been defined as that period of time in which a signal developed by the receiver in response to a predetermined receiver driving signal exceeds that, or some other, threshold level divided by that period in which the responsive signal failed to exceed the threshold level.

In summary, indirect methods of determining the probability of detection of a receiver are used, which methods are both poorly defined and are highly subjective.

SUMMARY OF THE INVENTION

It is therefore an object of the present invention to provide a novel means of determining the low signal level detecting capabilities of a pulse-type receiver which is both accurate and easy to perform.

Briefly, the preferred embodiment of the present invention includes an RF signal generator for developing signal pulses that will be correctly interpreted by the receiver under test. This is accomplished by: (1) phase-locking the RF source to the radar transmitting frequency which establishes the phase coherency essential for testing MTI (Moving Target Indicator) receivers; (2) pulse modulating the RF source with pulses of the correct width and phase to optimally match the bandwidth and STC (Sensitivity Time Control) curve of the receiver under test; and (3) adjusting the power output of the RF source by means of calibrated attenuators under the control of the MDS measurement circuits.

The MDS measurement circuit includes a first comparator for developing a bistate signal that is at a high level during the period that the receiver (under test) video output signal is more positive than a threshold level, and is at a low level during the period the signal is more negative than the threshold level. This bistate signal is standardized to an accurate voltage level and ground. The standardized bistate signal is fed to a gated integrator that is gated on for a predetermined period just preceding each RF pulse. The duty cycle of the bistate signal during the gated on period is equal to the probability of false alarm of the video output of the receiver under test with respect to the threshold level at the first comparator. The voltage output of the integrator is therefore proportional to the probability of false alarm and is fed to a second comparator and compared with a preset voltage, the amplitude of which represents a specific value of probability of false alarm. The output of this second comparator is used to control the threshold voltage of the first comparator and therefore sets this threshold voltage such that the probability of false alarm preset at the second comparator is constantly maintained by actively and continuously adjusting the threshold voltage at the first comparator. In like manner, the video noise on the video pulse output of the receiver under test is compared with the same threshold at the first comparator.

The inverted bilevel output of the first comparator is also standardized in amplitude and fed to a second gated integrator. This integrator is gated on only during the period of the video pulse. Due to the inversion of the bilevel output, the duty cycle of this bilevel signal is equal to the probability of detection of the video output of the receiver under test. The output voltage of this second gated integrator is therefore proportional to the probability of detection and is fed to a third voltage comparator where it is compared to a preset voltage the amplitude of which represents a desired level of probability of detection. The output of this comparator is used to adjust the RF signal power into the receiver under test until the two inputs of the third voltage comparator are equal and the probability of detection is therefore equal to the selected preset level. At this point, the RF power into the receiver under test is exactly that required to yield the preset values of probability of false alarm and probability of detection. This power figure can be exactly and repeatedly translated into values of minimum discernible signal (MDS) or tangential sensitivity, or any other measure of sensitivity.

An important advantage of this invention is that it measures the receiver video output directly in the statistical terms which are the very factors required to assess the true performance of the receiver in any system. In addition, the measurement is very sensitive. For example, if the inverse probability of detection (the parameter that is actually measured) is changed by 10%, the signal-to-noise ratio changes by less than 0.3 dB. Similarly, a 10% change in probability of false alarm changes the signal-to-noise ratio by less than 0.3 dB. The analog circuits used to measure these probabilities can be held to within 1% accuracy without difficulty, yielding a practical MDS/tangential sensitivity measurement accuracy assignable to the statistical measurement circuits of better than 1.1 dB.

IN THE DRAWING

FIG. 1 is a block diagram illustrating an automatic MDS level analyzer in accordance with the present inveniton;

DETAILED DESCRIPTION OF THE PREFERRED EMBODIMENT

Figure 1A:
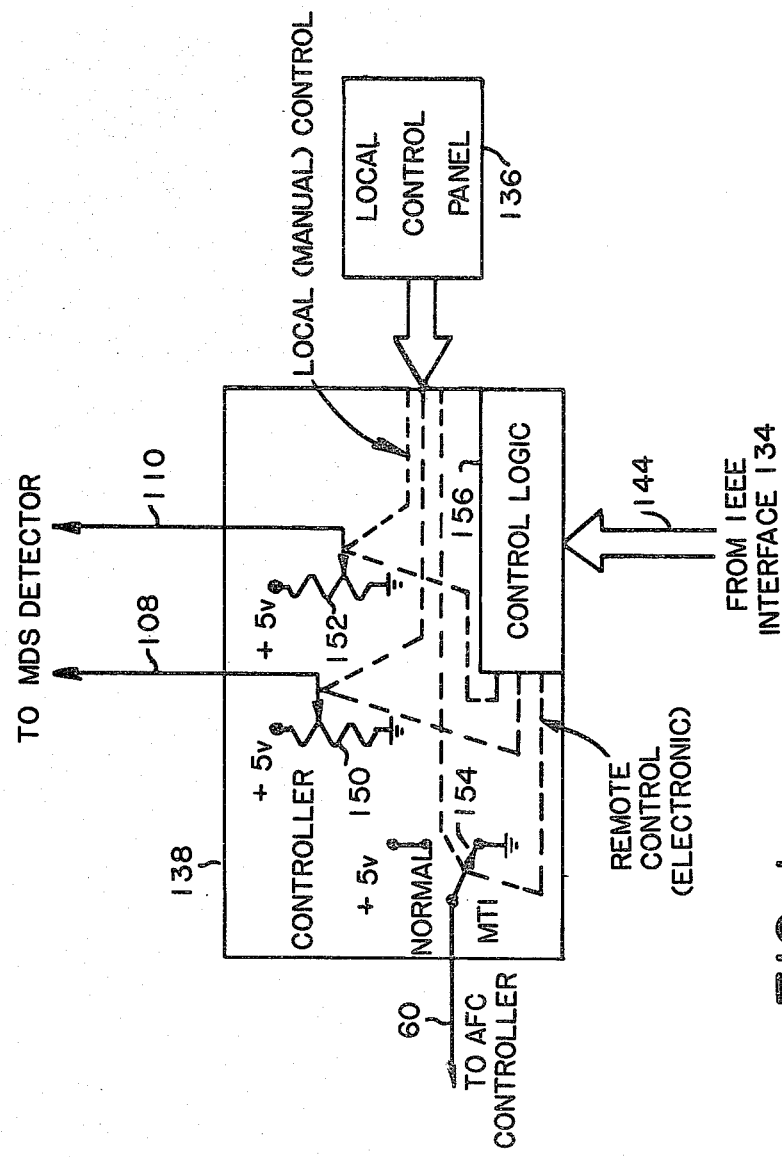
FIG. 1a is a diagram schematically illustrating the controller shown in FIG. 1.

Turning now to FIG. 1, a block diagram of a preferred embodiment of an automatic MDS level analyzer in accordance with the present invention is illustrated. The analyzer, which is generally designated by the number 10 for convenience, is shown connected to a moving target indicator (MTI) type radar receiver 12, although it is understood that other pulse-type receivers may also be tested using the analyzer. Typical MTI receivers are connected to an antenna by a directional coupler, illustrated by an antenna 14 and coupler 16, such that test signals may be injected at a directional coupler input terminal 18 and not disrupt normal radar operation. In addition, these receivers are typically provided with outputs at which test signals may be obtained, such outputs including a local oscillator output 20, a coherent oscillator output 22, a timing pulse output 24 and a video output 26. As illustrated, input 18 and outputs 20, 22, 24 and 26 are connected to the analyzer by lines 30, 32, 34, 36 and 38, respectively.

It is convenient to divide the analyzer into four portions: a portion 40 for generating a test pulse, a receiver output analyzing portion 42, a timing and control portion 44, and an interface portion 46. The test pulse generating portion 40 includes as principal active components, an automatic frequency control (AFC) controller 50, a radio frequency (RF) oscillator 52, a leveler 54, an RF switch 56 and an RF attenuator 58. AFC controller 50 has inputs connected to lines 32 and 34 for respectively receiving the local oscillator signal and the coherent oscillator signal generated by the receiver 12 under test. The controller 50 also has an input for receiving a control signal developed on a line 60, an input for receiving an RF oscillator output signal generated by oscillator 52 on a line 62 and an oscillator control output connected to line 64.

In general, AFC controller 50 utilizes the local oscillator signals and the coherent oscillator signals to generated a reference signal having a frequency and phase equal to that of the signal generated by the associated radar transmitter. This reference signal is combined with the signal generated by RF oscillator 52 to develop an error signal on line 64 which is used to correct the oscillator frequency.

More specifically, the local oscillator signal and either an internally generated signal at the receiver IF frequency or, when available, the coherent oscillator signal, are combined in a first mixer contained within controller 50. As determined by the control signal generated on line 60, the output of the first mixer may or may not be further combined with a signal at the normal MTI Doppler frequency in an internally contained single side band mixer to generate the reference signal. Next, the reference signal and the signal developed by RF oscillator 52 on line 62 are combined in an internally contained phase detector to generate an error signal on line 64 for controlling the frequency of the oscillator.

RF oscillator 52, which has an input connected to line 64 and an output connected to line 62, is responsive to the error signal generated on line 64 and is operative to develop a signal on line 62 at the radar transmitting frequency or at a frequency offset therefrom by the Doppler frequency.

Leveler 54, which has an input connected to line 62 for receiving the oscillator-generated signal, is operative to develop a constant level RF signal on an output which is connected to line 66. More particularly, the leveler includes a diode detector and PIN diode attenuator which are operative to level the input signal.

RF switch 56 has an RF input connected to line 66, a control input connected to a line 68, and an RF output connected to a line 70. The switch is responsive to the pulses generated on line 68 and is operative to selectively couple the constant level signal developed on line 66 to line 70 to develop an RF-pulsed signal on line 70.

Figure 4:
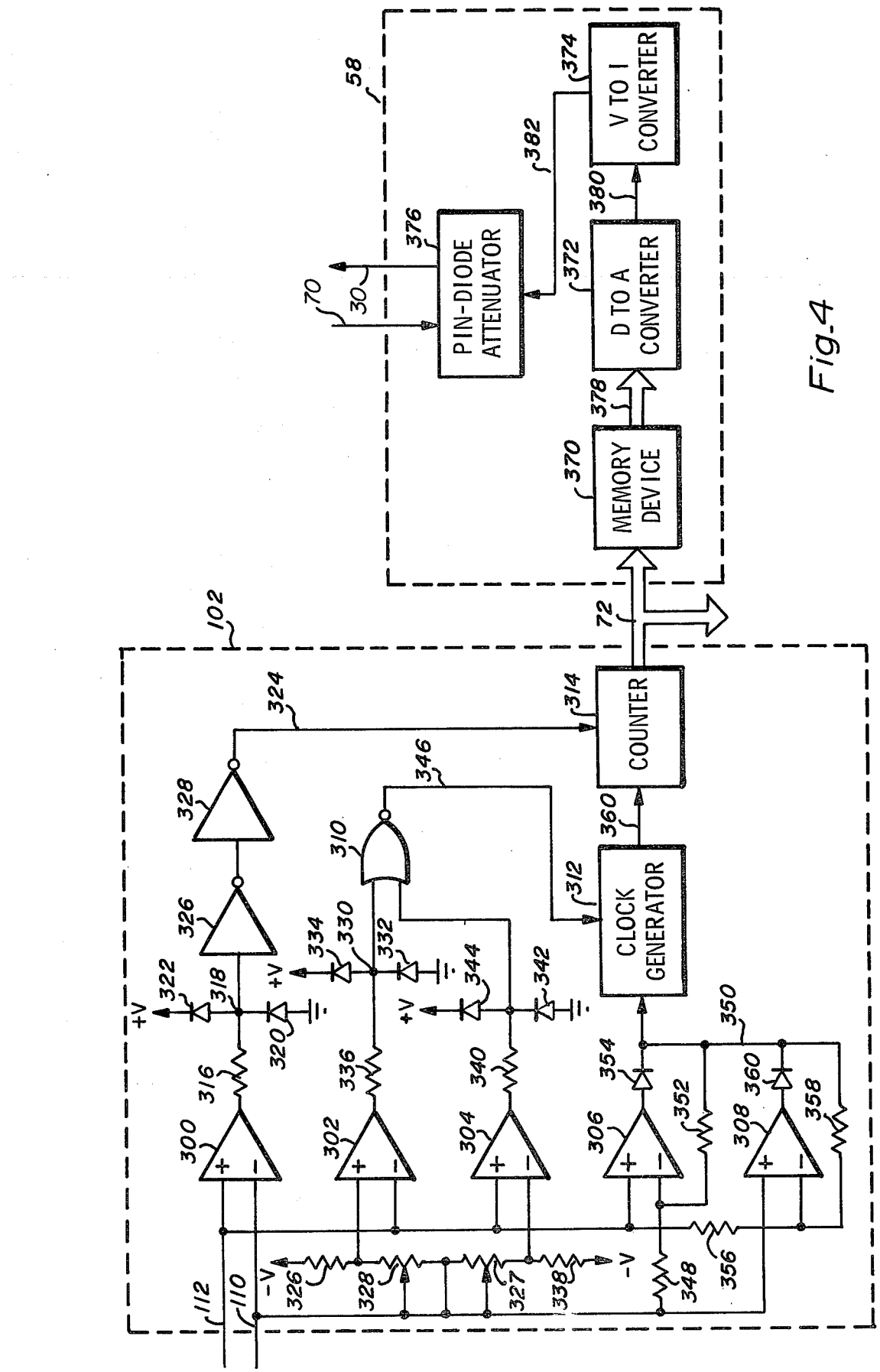
FIG. 4 is a block diagram further illustrating the A/D converter and RF attenuator shown in FIG. 1.

RF attenuator 58 is discussed in detail in connected with FIG. 4. In general, however, the attenuator has an input connected to line 70 for receiving pulsed RF signals, control inputs connected to a bus 72 and an output connected to line 30. The attenuator provides a degree of attenuation for signals coupled between line 70 and line 30 as determined by the digital control signals developed on line 72.

The portion 42 of the automatic MDS level analyzer which analyzes the receiver output developed on line 38 includes an MDS detector 100 and an analog-to-digital (A-D) converter 102 which are discussed in detail in connection with FIGS. 2 and 4, respectively. MDS detector 100 has an input connected to line 38 for receiving the signals developed at the video output of the receiver 12, an input connected to a line 104 and an input connected to a line 106 for receiving gating signals, an input connected to a line 108 and an input connected to line 110 for receiving selected reference level signals which are proportional to the desired false-alarm probability and the desired probability of detection, respectively, and generates an output on a line 112. As further explained below, the reference signals developed on lines 108 and 110 are voltages selected by an operator via local control panel 136.

In general, MDS detector 100 first establishes a threshold level based upon periods when switch 56 is off and thus no RF frequency pulses are being generated at line 30. The threshold level is such that the probability that the instantaneous signal level of the noise generated by receiver 12 on line 38 will exceed the threshold level during these periods is equal to the false-alarm probability.

Next, the MDS detector responds to the receiver detected pulses developed on line 38 by the receiver 12 in response to the RF pulses generated on line 30 to generate an error signal on line 112. The error signal, which is used to adjust the level of the RF pulses generated on line 30, is maintained such that the probability that the instantaneous amplitude of a detected pulse will exceed the threshold level is equal to the probability of detection. Sampling timing is controlled by the signals generated on lines 104 and 106.

A-D converter 102, which has an input connected to line 112 for receiving the error signal and an input connected to line 110 for receiving the reference level signal (desired probability of detection), generates binary digital outputs on bus 72 which are proportionally related to the error signal developed on line 112 and are used to control the attenuation of attentuator 58.

The timing and control portion of the automatic MDS level analyzer includes a converter 130, a display 132, an IEEE interface 134, a local control panel 136, a voltage level controller 138 and a timing controller 139. Converter 130 is typically a pre-programmed read only memory (ROM) device which converts the digital control signals developed on bus 72 from the arbitrary digital numbers required to drive attenuator 58 to corresponding digital signals developed on a bus 140 which are used to drive a numerical display 132 for directly indicating the signal level of the RF pulses generated on line 30.

Display 132 is a standard four element digital (8 segment) display unit which provides a visually perceptible readout of the numerical signals developed on bus 140. The block 134 labeled IEEE INTERFACE is a well known device manufactured in accordance with the American National Standard known as IEEE Standard 488-1975 which was published in 1975 in a document entitled "IEEE STANDARD DIGITAL INTERFACE FOR PROGRAMMABLE INSTRUMENTATION". It contains hardwired bus command and address logic and may be implemented using a Motorola MC68488 general purpose interface adaptor, or the like. This block forms no part of the present invention and is included merely to show that it is possible to remotely monitor the output which is locally displayed on the display 132 and to remotely input to the controller 138 the same type of control that would be locally input at the local control panel illustrated by block 136. The double headed arrows shown on the bus lines 142 and 144 indicate that two way communication is intended between a remote location and the analyzer 10 via interface 134.

Local control 136 is merely the front panel of the system and includes switches and knobs, etc., which allow a local operator to set the voltage levels developed by controller 138 on lines 108 and 110 and to determine the signal to be developed on line 60. In addition, it may include "POWER ON/OFF", "STAND-BY", "CHANNEL SELECT" and other controls common to systems of the type disclosed in the present application. As indicated previously, the same types of inputs can be remotely communicated in digital form to controller 138 by means of IEEE interface 134.

Controller 138 is a functionally simple means for generating two reference voltages that are output on lines 108 and 110, and a two-state signal on line 60 in response to either manual inputs from local control 136, or digitally communicated signals input from a remote source input via interface 134 and bus 144. The functional simplicity of such device is illustrated in FIG. 1a and includes a pair of variable voltage sources 150 and 152, and a switching means 154, all of which can be adjusted or set by means of knobs or the like contained in the local control panel 136. Control 138 also includes suitable logic and control circuitry 156 for allowing the previously mentioned adjustment of potentiometers 150 and 152 as well as switch 154 to be accomplished remotely via interface 134. Whereas the signals developed on lines 108 and 110 are variable voltage levels, the signal developed on line 60 is merely a two-state signal which determines whether or not AFC controller 50 causes the output of its first mixer to be combined, or not be combined, with a signal at the normal MTI Doppler frequency in a single side band mixer in order to generate a reference signal.

Receiver detected pulses are processed by MDS detector 100 to develop the error signal used to control A-D converter 102, and thus RF attenuator 58, so as to maintain the level of the reference pulses generated on line 30 at a level such that the probability of detection is maintained at a preselected level. The reference pulse level is visually displayed in numerical form by display 132 (and is made remotely available via interface 134 and on bus 142) to provide an indication of the low level signal detecting capability of receiver 12.

Analyzer timing is determined by controller 139 and as indicated analyzer control is provided locally in response to the manual settings of controls in local control panel 136 and alternately in response to remote signals coupled by IEEE interface 134 into controller 138.

Figure 2:
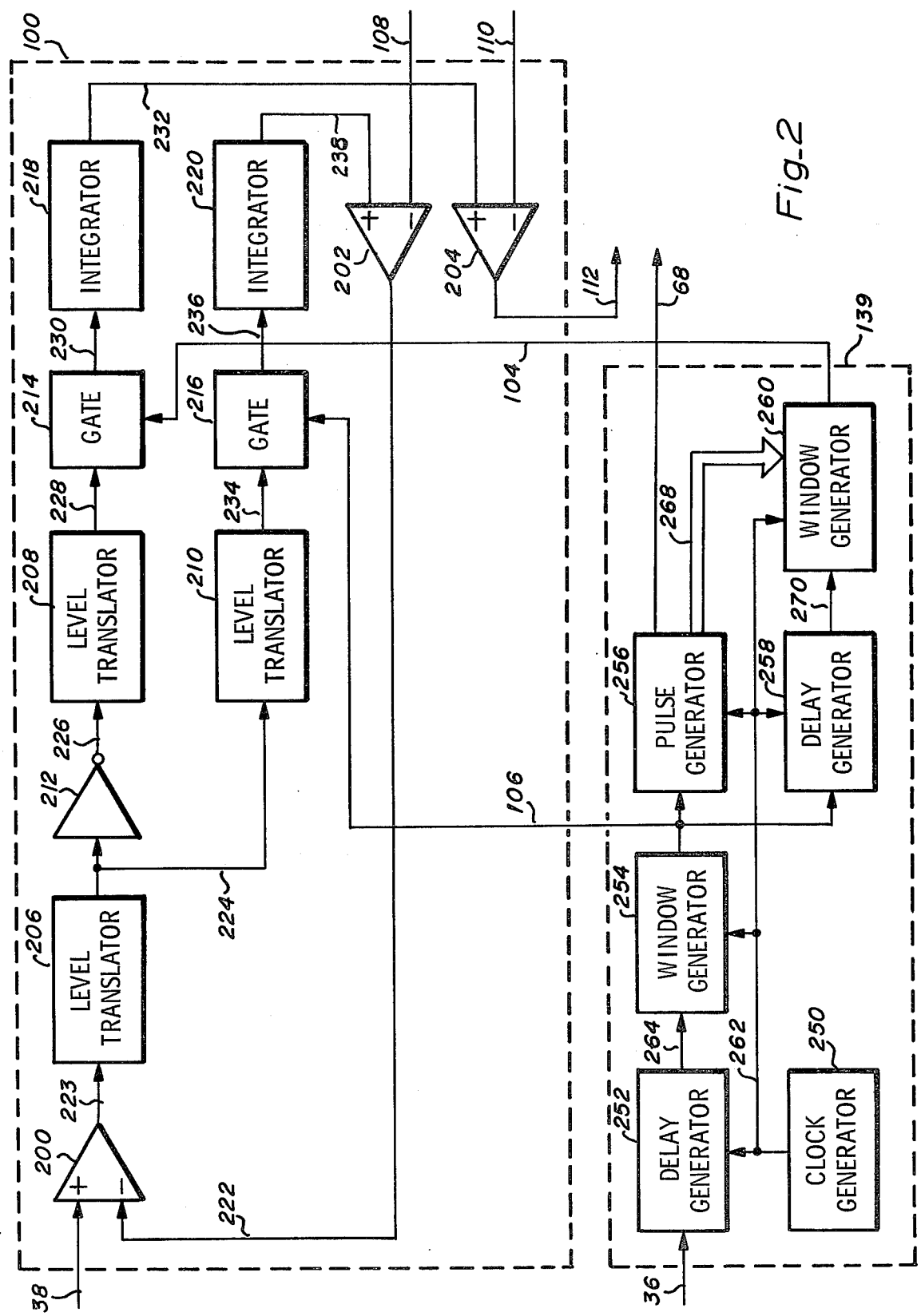
FIG. 2 is a block diagram further illustrating the MDS detector and timing controller shown in FIG. 1.

MDS detector 100 and timing controller 139 are illustrated in more detail in FIG. 2. The MDS detector is shown to include three comparators 200, 202 and 204, three level translators 206, 208 and 210, an inverter 212, two gates 214 and 216, and two integrators 218 and 220. Comparator 200 has a noninverting input connected to line 38 for receiving the video signal generated by the receiver, an inverting input connected to line 222 for receiving the threshold signal and an output connected to line 223. The comparator is operative to generate at its output a signal having a first or second level dependent upon whether the instantaneous amplitude of the signal generated on line 38 is greater than or less than the level of the threshold signal developed on line 222.

Level translator 206 which has an input connected to line 223 and an output which is connected to line 224 and by inverter 212 to line 226. The level translator is operative to convert the bilevel signals generated on line 223 to standard logic level signals developed on line 224. In the preferred embodiment, comparator 200, level translator 206, and inverter 212 are implemented using a device such as that designated LM161.

Level translator 208 develops from the logic level signals generated on line 226 bistate signals of a more precise amplitude level which are coupled by a line 228 to gate 214. In the preferred embodiment, the translator includes a common emitter transistor amplifier which is driven between cutoff and saturation by the signal developed on line 226. The collector of the transistor which is connected to line 228 is connected by a pullup resistor to a 15-volt potential such that in response to a high or low logic level signal developed on line 226, the translator develops on line 228 a near-zero volt or 15-volt signal, respectively.

Gate 214 includes an analog switch responsive to the gating signal developed on line 104 and operative to couple the bistate signal developed on line 228 to line 230. In the preferred embodiment, gate 214 is an analog switch such as that designated HI5048 by the Harris Corporation.

Integrator 218 which is of the series-resistor and shunt-capacitor configuration is operative to develop on line 232 a signal representing the filtered and stored representation of the gated signal developed on line 230.

Translator 210, gate 216 and integrator 220 are similar to translator 208, gate 214 and integrator 218, respectively. Translator 210 is responsive to the logic level signals developed on line 224 and operative to develop on a line 234 corresponding signals at the more precise zero and 15-volt levels. Gate 216 is responsive to the gating signal developed on line 106 and operative to couple the translated signals from line 234 to a line 236. Finally, integrator 220 filters and stores the gated signal to develop an integrated signal on a line 238.

Comparator 202 is responsive to the integrated signal developed on line 238 and the reference level signal developed on line 108 and operative to develop the threshold signal on line 222. Because of the closed loop configuration, the threshold level is generated such that the level of the integrated signal developed on line 238 is maintained at the reference level. In other words for a desired false-alarm probability of 10 percent a potential of 10 percent of the 15-volt potential developed by translator 210 or 1.5 volts would be developed on line 234. In response, comparator 202 would develop a threshold level on line 222 such that the noise developed by the receiver on line 38 during the gating period set by the gating pulse developed on line 106 would exceed the threshold level 10 percent of the time. Thus, following translation and integration of the signal developed by comparator 200 during the gating period, a 1.5 volt signal level would be developed on line 238.

Comparator 204 compares the integrated signal developed on line 232 and the reference level signal developed on line 110 to develop the error signal on line 112. Since the error signal is used to control the amplitude of the reference pulses which are used to drive the receiver, the level of the reference pulses is maintained such that the probability of detection is equal to one minus the ratio of the level of the reference signal developed on line 110 to the 15-volt level. In other words, for a reference level of 10 percent of the 15-volt level, or 1.5 volts the probability of detection is maintained at 90 percent.

Timing controller 139 is shown to include a clock generator 250, a delay generator 252, a window generator 254, a pulse generator 256, another delay generator 258, and another window generator 260. Clock generator 250 includes a crystal-controlled oscillator for generating accurate clocking pulses on an output line 262.

Delay generator 252, which includes suitable counters, gates and programmable switches, is responsive to each trigger pulse developed on line 36 and operative to develop a delay pulse on line 264 a predetermined number of clocking pulses in width. In the preferred embodiment, pulse widths of from 0 to 9,999 microseconds are switch selectable.

Suitable counters, gates and programmable switches included in window generator 254 count the clocking pulses developed on line 262 to develop a gating pulse on line 106 following the occurrence of each delay pulse developed on line 264. The width of the gating pulse is switch-selectable between the limits of 0 and 9,999 microseconds.

Triggered by the gating pulse developed on line 106, counters and switch-programmable gates in pulse generator 256 count the clocking pulses developed on line 262 following the occurrence of each gating pulse to develop the control pulse on line 68 having a width which is switch-selectable between the limits of 0 and 9.9 microseconds. The programming switches in pulse generator 256 are connected by a bus 268 to window generator 260.

In a similar fashion, counters and switch-programmable gates in delay generator 258 count the clocking pulses developed on line 262 to develop on a line 270 following each gating pulse, a delay pulse which has a switch selectable width of from 0 to 999.9 microseconds.

Window generator 260, which includes suitable counters and gates, is responsive to each delayed pulse generated on line 270 and following a 200-nanosecond delay is operative to generate the gating pulse on line 104. The window generator is controlled by the switches in pulse generator 256 such that the width of each gating pulse developed on line 104 is 400 nanoseconds shorter than the corresponding control pulse developed on line 68 and suitably delayed by delay generator 258.

Figure 3:
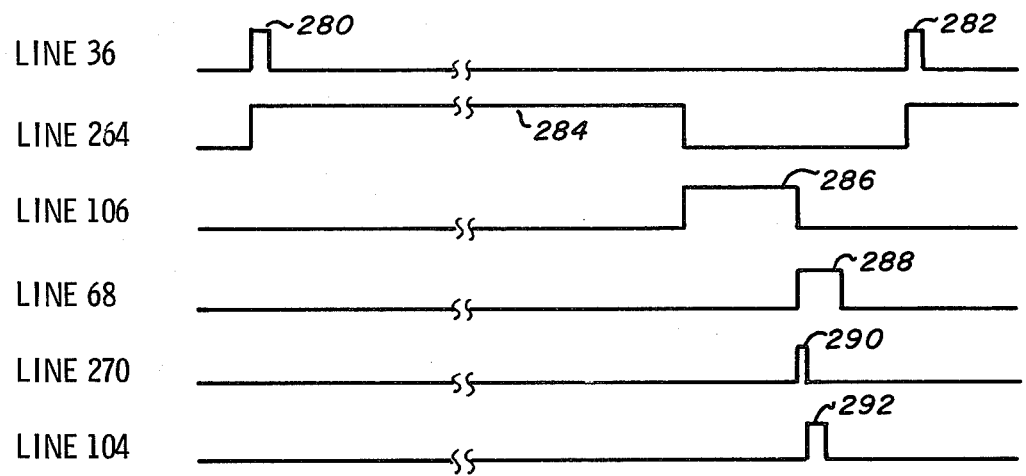
FIG. 3 is a timing diagram illustrating the operative states of the timing controller shown in FIG. 1.

Operation of timing controller 139 may be better understood with additional reference to FIG. 3. Illustrated at 280 and 282 are pulses such as the timing pulses developed on line 36 which are synchronized with the pulses generated by the associated radar transmitter. Delay generator 252 is responsive to each such pulse and operative to develop a delay pulse on line 264 such as the pulse which is illustrated at 284.

The delay pulse triggers window generator 254 which in response develops on line 106 a gating pulse such as the pulse illustrated at 286. This pulse is used to control gate 216 for sampling the noise developed by the receiver. Since many radar receivers have a gain which is increased at a time following each transmitted pulse, delay generator 252 provides a means for positioning the gating pulse such that the receiver noise may be sampled at a maximum gain setting.

Each gating pulse developed on line 106 is also operative to trigger pulse generator 256 and delay generator 258. Pulse generator 256 is responsive to a pulse such as pulse 286 and is operative to generate on line 68 a pulse such as the pulse illustrated at 288. This pulse is used to develop the corresponding RF reference pulse used to drive the receiver.

The gating pulse developed on line 106 triggers delay generator 258 which generates a pulse such as that illustrated at 290, causing window generator 260 to generate a gating pulse illustrated at 292. Delay generator 258 provides a means for compensating for the receiver delay. In this way, pulse 292 is aligned with the video pulse developed by the receiver in response to the reference pulse triggered by pulse 258. Since pulse 292 is 400 nanoseconds narrower than pulse 288, rise and fall time related problems of the receiver are eliminated.

Additional details of A-D converter 102 and RF attenuator 58 are illustrated in FIG. 4. A-D converter 102 includes as active components five comparators including comparators 300, 302, 304, 306 and 308, a NOR gate 310, a clock generator 312 and a counter 314. Gate 300 has a noninverting input connected to line 112 for receiving the error signal, an inverting input connected to line 110 for receiving the reference signal and an output connected by a resistor 316 to a node 318. The node is connected to circuit ground by a clamping diode 320, to a logic level power supply by a clamping diode 322, and to a line 324 by two pulse-shaping inverters 326 and 328.

The comparator is operative to generate on line 324 a count direction indicating signal which is indicative of whether the error signal level is greater than or less than the reference signal level.

Comparator 302 has a noninverting input which is connected to a negative potential by a biasing resistor 326 and to line 110 by a biasing potentiometer 328, an inverting input which is connected to line 112 and an output which is connected to a node 330 by a current-limiting resistor 332. Node 330 is connected to circuit ground by a clamping diode 332, to the positive power supply potential by another clamping diode 334 and to one input of NOR gate 310. Comparator 304 has a noninverting input which is connected to line 112 and an inverting input which is connected to line 110 by a biasing potentiometer 336 and to a positive power supply potential by a biasing resistor 338. The comparator also has an output which is connected to the other input of NOR gate 310 by a current-limiting resistor 340. Signals at this input of the NOR gate are similarly clamped by a diode 342 and a diode 344.

The biasing components are operative to develop potential at the noninverting input of comparator 302 and the inverting input of comparator 304 which are slightly less than and greater than, respectively, the reference signal level developed on line 110. Only when an error signal level is developed on line 112 which is within the range set by the reference potentials, low logic level signals are developed at both inputs to gate 310, causing the gate to generate a high logic level clock disable signal on a line 346.

Comparator 306 has a noninverting input which is connected to line 112 and an inverting input which is connected to line 110 by a gain determining resistor 348 and to a line 350 by another gain determining resistor 352 and an output which is connected to line 350 by a signal steering diode 354. Comparator 308 has a noninverting input connected to line 110 and an inverting input connected to line 112 by a gain-determining resistor 356 and to line 350 by another gain-determining resistor 358 and an output connected to line 360 by a signal steering diode 360.

Comparators 306 and 308 are operative to develop an amplified signal on line 350 representing the absolute value of the difference between the signal levels developed on line 112 and on line 110. In other words, when the error signal level developed on line 112 exceeds the reference signal level developed on line 110, the output of comparator 306 is coupled by diode 354 to line 350 to develop an amplified signal proportional to this difference, and when the potential on line 110 exceeds that developed on line 112, comparator 308 develops a positive amplified signal on line 350.

Clock generator 312 is responsive to the clock enable signal developed on line 346 and the clock rate signal developed on line 350 and operative to develop on a line 360 clocking pulses at a rate which is determined by the potential developed on line 350 except when disabled by the signal developed on line 346.

Counter 314, which has a clocking input connected to line 360 and an up/down input connected to line 324 dependent upon the signal developed on line 324, either adds or subtracts each pulse developed on line 360 from a binary sum representing a desired degree of attenuation which it develops on the six-line bus 72.

Operationally, when the error signal level developed on line 112 differs greatly from the reference signal level developed on line 110, a relatively large positive potential is developed on line 350 causing clock generator 312 to generate pulses on line 360 at a relatively high rate. As determined by the signal level developed on line 324 by comparator 300, these pulses are used to increment or decrement the binary sum to develop on bus 72 a signal closer to the required steady state value.

As the steady state value is approached, the error signal level developed on line 112 will approach the reference signal level developed on line 110 reducing the rate at which clocking pulses are developed on line 360. Finally, when the error signal level is within the desired range of the reference signal level, comparators 302 and 304 will cause gate 310 to develop a high signal level on line 346 inhibiting the generation of additional clocking pulses and thus further counting.

RF attenuator 58 includes a memory device 370, a digital-to-analog converter 372, a voltage-to-current converter 374 and a PIN diode attenuator 376. Memory device 370 is preprogrammed to respond to each of the linearly-incremented binary number signals developed at its address inputs, which are connected to bus 72 and operative to generate a nonlinearly-incremented binary number signal on a six-line output bus 378. This conversion is necessary in order to compensate for the nonlinear characteristics of PIN diode attenuator 376.

The binary number signals developed on bus 378 are converted to an analog voltage on a line 380 by digital-to-analog converter 372. This voltage is then converted by voltage-to-current converter 374 to a PIN diode attenuator driving current developed on a line 382.

Finally, PIN diode attenuator 376 provides a degree of coupling between lines 366 and 370 which is nonlinearly proportional to the driving current developed on line 382.

It will thus be seen that a binary number signal which is proportional to the desired signal level of the receiver driving reference pulses and which is developed on bus 72 is converted to a nonlinear current suitable for driving a standard PIN diode attenuator.

It is contemplated that after having read the preceeding disclosure certain alterations and modifications of the present invention will no doubt become apparent to those skilled in the art. It is therefore intended that the following claims be interpreted to cover all such alterations and modifications as fall within the true spirit and scope of the invention.

What is claimed is:

1. An analyzer for evaluating the low signal level detecting capabilities of a receiver responsive to receiver driving pulses to develop noisy signal pulses and which generates noise during quiescent periods, comprising:

pulse generator means for generating a series of receiver driving pulses having amplitudes determined by a pulse generator control signal, which is coupled into an input of the receiver under test;

level controller means for a first comparison of the instantaneous amplitude of the noise generated at an output of said receiver and the level of a threshold signal during a series of first sample periods, each during one of said quiescent periods, thereby adjusting the level of said threshold signal such that during each one of said first sample periods the average period during which the instantaneous amplitude of said noise exceeds said threshold signal is a predetermined portion of said first sample periods, and for a second comparison of the instantaneous amplitude of the noisy signal pulses generated at the output of said receiver and said threshold signal during a series of second sample periods, each during a noisy signal pulse, thereby generating said pulse generator control signal to maintain the amplitude of each one of said receiver driving pulses at a level such that the average period during which the instantaneous amplitude of said noisy signal pulses exceeds said threshold signal is a predetermined portion of said one of said second sample periods; and display means for indicating the amplitude of said receiver driving pulses to provide an indication of the low signal level detecting capabilities of said receiver.

2. An analyzer as recited in claim 1 wherein said receiver further generates a series of timing pulses and wherein said analyzer further comprises timing controller means responsive to said series of timing pulses and operative to generate a series of switching pulses which are coupled to said pulse generator means for controlling the timing of said receiver driving pulses, to generate a first series of gating pulses which are coupled to said level controller means for controlling the timing of said first sample periods and to generate a second series of gating pulses which are coupled to said level controller means for controlling the timing of said second sample periods.

3. An analyzer as recited in claim 2 wherein said receiver further generates a local oscillator signal and wherein said pulse generator means includes:

oscillator means responsive to a frequency control signal and operative to generate a reference oscillator signal having a frequency commensurate therewith;

frequency control means including means for comparing the frequency of said reference oscillator signal with the frequency of a signal derived from said local oscillator signal to generate said frequency control signal such that the frequency of said reference oscillator signal is maintained a predetermined offset from the frequency of said local oscillator signal;

leveler means for developing a constant amplitude reference oscillator signal;

switch means responsive to said switching pulses and operative to develop a series of reference pulses from said constant amplitude reference oscillator signal; and attenuator means responsive to said control signal and operative to develop said receiver driving pulses from said reference pulses.

4. An analyzer as recited in claim 3 wherein said attenuator means includes:

memory means having a plurality of storage locations each containing a PIN diode attenuator driving value, said memory means being responsive to said control signal and operative to develop a delinearlized signal;

digital-to-analog converting means responsive to said delinearized signal and operative to develop a PIN diode attenuator driving voltage;

voltage-to-current converting means responsive to said PIN diode attenuator driving voltage and operative to develop a PIN diode attenuator driving current;

whereby the linearly incremented control signal is mapped into a nonlinearly incremented current signal suitable for causing linearly incremented attenuation steps of a PIN diode attenuator; and PIN diode attenuator means responsive to said PIN diode attenuator driving current and operative to develop said receiver driving pulses from said reference pulses.

5. An analyzer as recited in claim 2 wherein said timing controller means includes:

first delay generator means responsive to said timing pulses and operative to generate a first series of delayed pulses such that a predetermined characteristic of each one of said first delayed pulses occurs a predetermined period following a corresponding one of said timing pulses;

first window generator means responsive to said first delayed pulses and operative to generate said first gating pulses;

means responsive to said first gating pulses and operative to generate said switching pulses such that each one of said switching pulses occurs a predetermined period following a corresponding one of said first gating pulses;

second delay generator means responsive to said first gating pulses and operative to generate a second series of delayed pulses such that a predetermined characteristic of each one of said second delayed pulses occurs a predetermined period following a corresponding one of said first gating pulses; and second window generator means responsive to said second delayed pulses and operative to generate said second gating pulses.

6. An analyzer as recited in claim 2 wherein said level controller means includes:

first comparator means for comparing the instantaneous amplitude of a receiver output signal comprised of said noise and said noisy signal pulses with the level of said threshold signal to develop a bistate signal having a first predetermined condition when the level of said receiver output signal exceeds the level of said threshold signal and a second predetermined condition otherwise;

first translator means responsive to said bistate signal and operative to develop a first translated signal having a first predetermined amplitude when said bistate signal exhibits said first condition and a second predetermined amplitude otherwise;

first gating means responsive to said first gating pulses and operative to sample said first translated signal to develop a first series of sampled pulses;

first integrator means for filtering and storing said first sampled pulses;

means for developing a first constant signal having a predetermined level; and second comparator means for comparing the level of said filtered and stored first sampled pulses with the level of said first constant signal to develop said threshold signal.

7. An analyzer as recited in claim 2 wherein said level controller means includes:

first comparator means for comparing the instantaneous amplitude of a receiver output signal comprised of said noise and said noisy signal pulses with the level of said threshold signal to develop a bistate signal having a first predetermined condition when the level of said receiver output signal exceeds the level of said threshold signal and a second predetermined condition otherwise;

second translator means responsive to said bistate signal and operative to develop a second translated signal having a first predetermined amplitude when said bistate signal exhibits said first condition and a second predetermined amplitude otherwise;

second gating means responsive to said second gating pulses and operative to sample said second translated signal to develop a second series of sampled pulses;

second integrator means for filtering and storing said second sampled pulses;

means for developing a second constant signal having a predetermined level; and third comparator means for comparing the level of said filtered and stored second sampled pulses with the level of said second constant signal to develop a difference signal from which said control signal is derived.

8. An analyzer as recited in claim 7 wherein said controller means further includes:

means responsive to said difference signal and said second constant signal and operative to generate a polarity signal which exhibits a first predetermined characteristic when the level of said difference signal exceeds the level of said second constant signal and a second predetermined characteristic otherwise;

means responsive to said difference signal and said second constant signal and operative to generate an absolute value signal which is proportional to the absolute value of the difference between said difference signal and said second constant signal;

clock means responsive to said absolute value signal and operative to generate a series of clocking pulses at a rate commensurate therewith; and means responsive to said series of clocking pulses and said polarity signal and operative to increment a sum by the number of said clocking pulses when said polarity signal exhibits said first predetermined characteristic and to decrement said sum by the number of said clocking pulses otherwise to develop said control signal.

9. An analyzer as recited in claim 8 wherein said controller means further includes means responsive to said difference signal and said second constant signal and operative to generate an inhibit signal when the level of said difference signal is within a predetermined amount of said second constant signal and wherein said clock means includes means responsive to said inhibit signal and operative to prevent said series of clocking pulses from being generated.

10. An analyzer as recited in claim 9 wherein said level controller means further includes:

first translator means responsive to said bistate signal and operative to develop a first translated signal having a first predetermined amplitude when said bistate signal exhibits said first condition and a second predetermined amplitude otherwise;

first gating means responsive to said first gating pulses and operative to sample said first translated signal to develop a first series of sampled pulses;

first integrator means for filtering and storing said first sampled pulses;

means for developing a first constant signal having a predetermined level; and second comparator means for comparing the level of said filtered and stored first sampled pulses with the level of said constant signal to develop said threshold signal.

11. An analyzer as recited in claim 10 wherein said receiver further generates a local oscillator signal and wherein said pulse generator means includes:

oscillator means responsive to a frequency control signal and operative to generate a reference oscillator signal having a frequency commensurate therewith;

frequency control means including means for comparing the frequency of said reference oscillator signal with the frequency of a signal derived from said local oscillator signal to generate said frequency control signal such that the frequency of said reference oscillator signal is maintained a predetermined offset from the frequency of said local oscillator signal;

leveler means for developing a constant amplitude reference oscillator signal;

switch means responsive to said switching pulses and operative to develop a series of reference pulses from said constant amplitude reference oscillator signal; and attenuator means responsive to said control signal and operative to develop said receiver driving pulses from said reference pulses.

12. An analyzer as recited in claim 11 wherein said attenuator means includes:

memory means having a plurality of storage locations each containing a PIN diode attenuator driving value, said memory means being responsive to said control signal and operative to develop a delinearized signal;

digital-to-analog converting means responsive to said delinearized signal and operative to develop a PIN diode attenuator driving voltage;

voltage-to-current converting means responsive to said PIN diode attenuator driving voltage and operative to develop a PIN diode attenuator driving current;

whereby the linearly incremented control signal is mapped into a nonlinearly incremented current signal suitable for causing linearly incremented attenuation steps of a PIN diode attenuator; and PIN diode attenuator means responsive to said PIN diode attenuator driving current and operative to develop said receiver driving pulses from said reference pulses.

13. An analyzer as recited in claim 12 wherein said timing controller means includes:

first delay generator means responsive to said timing pulses and operative to generate a first series of delayed pulses such that a predetermined characteristic of each one of said first delayed pulses occurs a predetermined period following a corresponding one of said timing pulses;

first window generator means responsive to said first delayed pulses and operative to generate said first gating pulses;

means responsive to said first gating pulses and operative to generate said switching pulses such that each one of said switching pulses occurs a predetermined period following a corresponding one of said first gating pulses;

second delay generator means responsive to said first gating pulses and operative to generate a second series of delayed pulses such that a predetermined characteristic of each one of said second delayed pulses occurs a predetermined period following a corresponding one of said first gating pulses; and second window generator means responsive to said second delayed pulses and operative to generate said second gating pulses.

* * * * *